(12) United States Patent
Irth et al.

(10) Patent No.: US 8,634,983 B2
(45) Date of Patent: Jan. 21, 2014

(54) METHOD FOR INDIRECTLY MONITORING TIRE PRESSURE AND TIRE PRESSURE MONITORING SYSTEM

(75) Inventors: Markus Irth, Mainz-Kastel (DE); Daniel Fischer, Schwalbach (DE); Andreas Köbe, Bensheim (DE); Christian Sußmann, Bad Soden (DE)

(73) Assignee: Continental Teves AG & Co., OHG (DE)

( * ) Notice: Subject to any disclaimer, the term of this patent is extended or adjusted under 35 U.S.C. 154(b) by 358 days.

(21) Appl. No.: 12/747,063

(22) PCT Filed: Nov. 27, 2008

(86) PCT No.: PCT/EP2008/066299
§ 371 (c)(1),
(2), (4) Date: Aug. 30, 2010

(87) PCT Pub. No.: WO2009/074458
PCT Pub. Date: Jun. 18, 2009

(65) Prior Publication Data
US 2011/0060500 A1    Mar. 10, 2011

(30) Foreign Application Priority Data

Dec. 10, 2007 (DE) .......................... 10 2007 059 648
Nov. 11, 2008 (DE) .......................... 10 2008 056 664

(51) Int. Cl.
| G01M 17/00 | (2006.01) |
| G06F 7/00 | (2006.01) |
| G06F 11/30 | (2006.01) |
| G06F 19/00 | (2011.01) |
| G07C 5/00 | (2006.01) |

(52) U.S. Cl.
USPC ............ 701/29.1; 701/36; 340/442; 340/443; 340/444

(58) Field of Classification Search
USPC ............................ 701/29.1, 36; 340/442–444
See application file for complete search history.

(56) References Cited

U.S. PATENT DOCUMENTS

| 5,553,491 | A | * | 9/1996 | Naito et al. ................... 73/146.5 |
| 5,557,552 | A | * | 9/1996 | Naito et al. ................... 702/148 |
| 5,826,207 | A | * | 10/1998 | Ohashi et al. .................. 701/36 |
| 6,182,001 | B1 | * | 1/2001 | Sugai et al. ..................... 701/78 |

(Continued)

FOREIGN PATENT DOCUMENTS

| DE | 10058140 A1 | 1/2002 |
| DE | 102005004910 A1 | 9/2005 |
| EP | 0578826 A1 | 1/1994 |
| WO | WO 03/031990 A1 | 4/2003 |

*Primary Examiner* — Prasad Gokhale
(74) *Attorney, Agent, or Firm* — RatnerPrestia (57) ABSTRACT

A method for indirectly monitoring tire pressure or for detecting damage to a wheel suspension, wherein a pressure loss detection variable (DVE) is determined using an analysis of a vibratory behavior of a wheel of a motor vehicle, and a pressure loss in the tire of the wheel or damage to the wheel suspension is detected by comparing a momentarily determined pressure loss detection variable ($DVE_{akt}$) to a learned pressure loss detection variable ($DVE_{soll}$), wherein at least two dimensional variables are determined from a wheel speed signal (w) of the wheel, each representing a dimension for the extent of a frequency or a frequency range in the vibratory behavior of the wheel, and that the pressure loss detection variable (DVE) is derived from the two dimensional variables (e1, e2, e3), particularly from a ratio of the two dimensional variables (e2/e3), and a tire pressure monitoring system.

20 Claims, 5 Drawing Sheets

(56) References Cited

U.S. PATENT DOCUMENTS

| | | | |
|---|---|---|---|
| 7,248,953 B2* | 7/2007 | Ogawa | 701/30.2 |
| 2002/0059826 A1* | 5/2002 | Ono et al. | 73/146.5 |
| 2003/0192375 A1* | 10/2003 | Sugai et al. | 73/146 |
| 2004/0201466 A1* | 10/2004 | Ikeda et al. | 340/442 |
| 2004/0260436 A1* | 12/2004 | Kin | 701/29 |
| 2005/0072223 A1* | 4/2005 | Fennel et al. | 73/146.2 |
| 2007/0139179 A1* | 6/2007 | Yanase | 340/443 |
| 2008/0140276 A1* | 6/2008 | Griesser et al. | 701/29 |
| 2010/0211250 A1* | 8/2010 | Fischer et al. | 701/29 |

* cited by examiner

METHOD FOR INDIRECTLY MONITORING TIRE PRESSURE AND TIRE PRESSURE MONITORING SYSTEM

CROSS REFERENCE TO RELATED APPLICATIONS

This application is the U.S. national phase application of PCT International Application No. PCT/EP2008/066299, filed Nov. 27, 2008, which claims priority to German Patent Application No. 10 2007 059 648.2, filed Dec. 10, 2007, and German Patent Application No. 10 2008 056 664.0, filed Nov. 11, 2008, the contents of such applications being incorporated by reference herein.

FIELD OF THE INVENTION

The invention relates to a method for indirectly monitoring tire pressure or for detecting damage to a wheel suspension system and to a tire pressure monitoring system in which a wheel speed ($\omega$) of at least one wheel or a variable which is associated with the wheel speed ($\omega$) of the wheel is obtained and is evaluated for the detection of a tire pressure loss.

BACKGROUND OF THE INVENTION

Various tire pressure monitoring systems are known which operate either on the basis of directly measuring sensors or detect an abnormal tire pressure by evaluating rotational speed properties or oscillation properties of the vehicle wheels.

DE 100 58 140 A1, which is incorporated by reference, discloses what is referred to as an indirectly measuring tire pressure monitoring system which detects a tire pressure loss by evaluating the rotational movement of the wheel (DDS: Deflation Detection System).

EP 0 578 826 B1, which is incorporated by reference, discloses a tire pressure gauge which determines a pressure loss in a tire on the basis of tire oscillations, wherein at least one resonant frequency component is extracted from the tire oscillations.

A method for indirectly monitoring tire pressure which, by taking into account the natural torsional frequency of the tires, improves an indirectly measuring tire pressure monitoring system which is based on the evaluation of the rotational movement of the wheel is disclosed in patent application DE 10 2005 004 910 A1, which is incorporated by reference.

A tire monitoring system with combined evaluation of wheel speed information and analysis of the axial frequency in which the vertical acceleration of the wheels is measured and taken into account by means of sensors is described in WO 03/031990 A1, which is incorporated by reference.

Indirect systems for detecting loss of tire pressure which are known from the prior art resort to the wheel speed information in order to calculate an indicator variable for a tire pressure loss (pressure loss detection variable), wherein the change in the natural frequency or resonant frequency of the torsional oscillation between the rim and the belt in the event of a pressure loss is used as an indicator variable which can be observed in a frequency spectrum of the wheel speed signal. This change is based on the reduction in the torsional spring constant between the belt and the rim when there is reduced pressure in the tire. The displacement/change in the resonant frequency of a current frequency spectrum of the wheel speed compared to a resonant frequency learnt in the case of correct tire air pressure is then used to detect the pressure loss.

SUMMARY OF THE INVENTION

An object of the invention is to make available an alternative method for indirectly monitoring tire pressure or a method for detecting damage to a wheel suspension system in which the oscillation behavior of at least one wheel is evaluated.

The term "wheel speed" is understood according to aspects of the invention as a generalization of the term. For example, the term is also understood to refer to all other wheel rotational movement variables which are directly logically linked to the wheel speed, for example rotation time, angular speed or rotational speed.

The invention relates to the idea of detecting a pressure loss at a wheel and/or damage to a wheel suspension system by comparing a currently determined pressure loss detection variable with a learnt pressure loss detection variable, wherein the pressure loss detection variable is determined from at least two dimensional variables which are determined from the wheel speed signal of the wheel and which each represent a measure of the value of a frequency or of a frequency range in the oscillation behavior of the wheel.

The frequencies are advantageously different resonant frequencies of a wheel torsional oscillation and/or a wheel vertical oscillation, and the frequency ranges are advantageously different frequency ranges about the resonant frequencies of a wheel torsional oscillation and/or a wheel vertical oscillation. These resonant frequencies reflect the torsional spring constant between the tire belt and rim and the spring/shock absorber effect of the tire in respect of a vertical movement, and therefore depend on the tire pressure.

The pressure loss detection variable is preferably formed from a ratio between the two dimensional variables. As a result, influences due to the excitation of the road are minimized and incorrect warnings are therefore avoided.

During the calculation of the pressure loss detection variable, the vehicle velocity is preferably additionally included in order to take into account its influence on the pressure loss detection variable directly.

In order to determine a dimensional variable, the wheel speed signal is preferably filtered with a bandpass filter with cutoff frequencies about the corresponding natural frequency. The variance of the filtered signal is particularly preferably used as a measure of the energy in this range. In order to determine the dimensional variables, it is then not necessary to determine a frequency spectrum of the wheel speed signal so that there is also no corresponding need for storage space to calculate a frequency spectrum.

According to one preferred embodiment of the invention, dimensional variables are determined for three different frequencies and/or frequency ranges and are used for pressure loss detection and/or damage detection in order to take into account the widest possible range of wheel oscillations during the monitoring process. Two resonant frequencies or resonant frequency ranges of wheel torsional oscillations and a resonant frequency or a resonant frequency range of a wheel vertical oscillation are particularly preferably evaluated since these resonant frequencies exhibit different behavior in terms of their value in the event of a loss of tire pressure and/or when different interference variables, for example road excitations, occur.

In order to take into account the influence of road excitations and other interference effects as comprehensively as possible, the pressure loss detection variable is preferably formed from a ratio between two dimensional variables, and the pressure loss detection variable is additionally learnt as a function of the third dimensional variable. In order also to minimize the influences due to road excitations in terms of the third dimensional variable, the pressure loss detection variable is particularly preferably learnt as a function of a ratio between two dimensional variables, which ratio contains the third dimensional variable.

In order to take into account directly the vehicle velocity, which is a measure of the wheel excitation, the pressure loss detection variable is preferably calculated from a ratio between two dimensional variables and the vehicle velocity. The vehicle velocity is usually available within the scope of a slip control system or is measured with a sensor.

For reliable monitoring it is advantageous if at least two of the frequencies and/or frequency ranges considered are selected in such a way that the corresponding dimensional variables exhibit a different change in terms of their values or an opposing behavior in terms of their change in the event of a tire pressure loss/wheel suspension damage.

In order to keep the expenditure on evaluation and therefore the costs of implementation low, a dimensional variable is preferably determined by means of bandpass filtering of the wheel speed signal, wherein the variance of the filtered signal is used as a dimensional variable. The cutoff frequencies of the respective bandpass filter correspond to the frequency range which is considered. In order to eliminate statistical fluctuations, mean value formation or mean value filtering of the variance is particularly preferably carried out.

According to one preferred embodiment of the method according to aspects of the invention, a dimensional variable is obtained as an amplitude value of the frequency spectrum of the wheel speed signal at a predefined or specific frequency. As a result, apart from the calculation of the frequency spectrum, the evaluation can be implemented in a simple and therefore cost-effective way. This is advantageous in particular if the frequency spectrum has to be calculated within the scope of another method.

According to another preferred embodiment of the method according to aspects of the invention, a dimensional variable is determined by integrating or averaging the amplitude values of the frequency spectrum of the wheel speed signal in a predefined or specific frequency range. Although more evaluation steps, for example the buffering of values, are necessary for this type of evaluation, the dimensional variable which is determined then depends on a large number of amplitude values, with the result that a possibly incorrectly determined amplitude value makes a smaller contribution to the falsification of the dimensional variable.

For simple and cost-effective evaluation, the frequencies and/or frequency ranges for determining the dimensional variables are preferably predefined.

In order to adapt the determination of the dimensional variables to the respective vehicle and therefore achieve more reliable pressure loss detection/damage detection, the resonant frequency or the frequency ranges in which a resonant frequency is located are preferably determined from an obtained frequency spectrum of the wheel speed signal. If only the resonant frequencies are determined from the obtained frequency spectrum, corresponding frequency ranges can be determined from the obtained resonant frequency and predefined frequency interval.

It is likewise preferred to obtain the resonant frequencies or frequency ranges from model parameters of at least one model or at least one model-based equation, wherein the model parameters are determined by parameter estimation with evaluation of the wheel speed signal. This is advantageous in particular in cases in which the method according to aspects of the invention is carried out in addition to a tire pressure monitoring system whose pressure loss detection is based on such a model or model-based equation since in these cases the model parameters are already available.

During the learning phase, a dependence between one dimensional variable (or a ratio between dimensional variables) and another dimensional variable (or one (other) ratio between dimensional variables) is preferably learnt. The learnt dependence is then used in the comparison phase or pressure loss monitoring phase for compensating the corresponding variable (dimensional variable or ratio between dimensional variables) in terms of the other variable (dimensional variable or ratio between dimensional variables). As a result the detection is improved since alternating dependencies can be taken into account/compensated. The pressure loss detection variable, which is determined from a ratio between dimensional variables, is particularly preferably learnt as a function of another ratio between dimensional variables. In the comparison phase, the current pressure loss detection variable is then compensated by means of the learnt dependence, and the compensated current pressure loss detection variable is used for comparison with the learnt pressure loss detection variable. As a result, nonlinearities in the components of the wheel suspension system are taken into account.

The dependence of a dimensional variable (or of a ratio between dimensional variables) on the vehicle velocity and/or of a dimensional variable (or of a ratio between dimensional variables) on a temperature is likewise preferably learnt in the learning phase and taken into account in the comparison phase since both the speed and the temperature have an influence on the wheel oscillation.

The dependence between one variable and another variable is preferably predefined in the form of a functional relationship with parameter variables, wherein the parameter variables are determined during the learning phase. For this purpose, value pairs of the variables are stored, and the parameter variables are determined using the value pairs.

In a less computationally costly method, the dependence between a first variable and a second variable is determined by the first variable being learnt in value intervals of the second variable. A comparison between a current first variable then takes place with the corresponding, learnt value of the first variable for the same value of the second variable.

According to one development of the invention, the method according to aspects of the invention is combined with another method for indirectly monitoring tire pressure. A more reliable pressure loss detection therefore becomes possible. A combination with a method whose pressure loss detection variable is a resonant frequency is particularly advantageous. In this context, a large number of the variables which are necessary for detection, for example the frequency spectrum, then only have to be determined once, and can then be used by both methods.

Since tire pressure monitoring methods often only provide reliable pressure loss detection under specific conditions, it is preferred to carry out the pressure loss detection as a function of the vehicle velocity and/or the values of the dimensional variables by means of the one or other method for indirectly monitoring tire pressure, or to carry out the warning through a weighted combination of the results of the two methods, wherein the weighting is changed as a function of the vehicle velocity and/or the values of the dimensional variables.

One advantage of the method according to aspects of the invention is that, compared to other methods, more reliable warning is possible since different frequency ranges of oscillations and/or types of oscillations of the wheels are included in the monitoring. As a result, it is also possible to compensate various interference effects. A further advantage of the method according to aspects of the invention is that the consideration of a ratio between dimensional variables allows the interference influence of the excitation of the road to be at least partially compensated in an easy fashion.

The invention also relates to a tire pressure monitoring system in which a method as described above is carried out.

BRIEF DESCRIPTION OF THE DRAWINGS

The invention is best understood from the following detailed description when read in connection with the accompanying drawings. Included in the drawings is the following features.

DETAILED DESCRIPTION OF THE PREFERRED EMBODIMENTS

Figure 1:
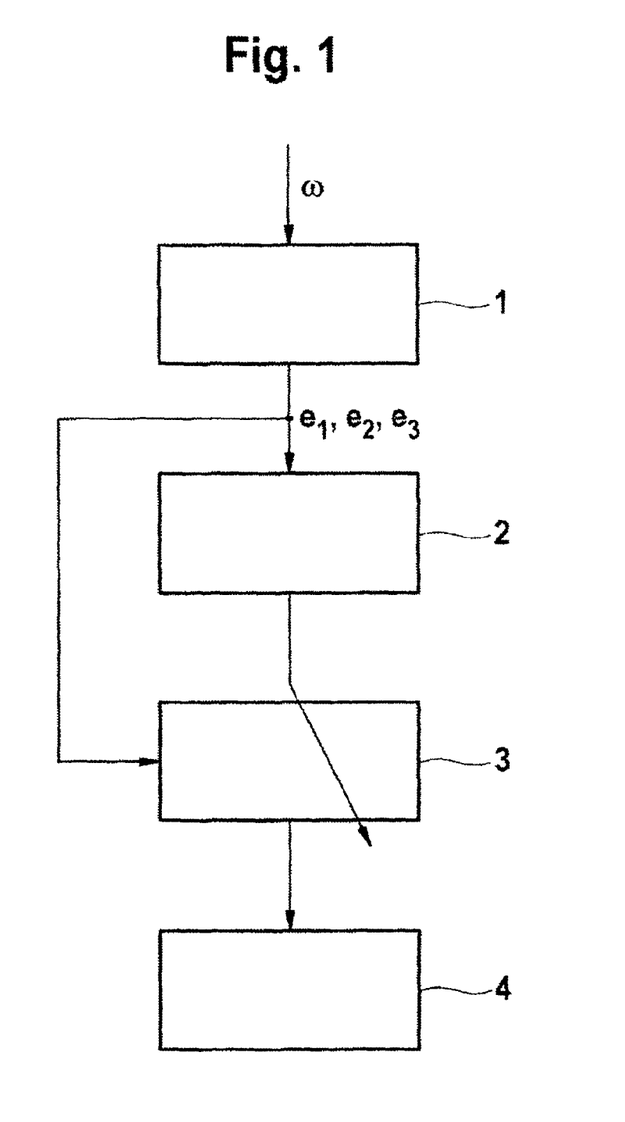
FIG. 1 shows a flowchart of a first exemplary embodiment of a method according to aspects of the invention.

FIG. 1 is a schematic view of a flowchart of a first exemplary embodiment of a method according to aspects of the invention. In block 1, at least two, for example three, dimensional variables e1, e2 and e3 are determined from a wheel speed signal $\omega$ of a wheel by means of an energy evaluation method. Each dimensional variable constitutes a measure of the value of a frequency or of a frequency range in the oscillation behavior of the wheel. In block 2, the oscillation behavior of the tire in the case of a correct or predefined air pressure is obtained and the dimensional variables and/or a pressure loss detection variable DVE which is determined from dimensional variables are learnt in a learning phase. After the learning, evaluation of the dimensional variables and/or of the pressure loss detection variable DVE which is determined from dimensional variables takes place in block 3. By comparing a currently determined pressure loss detection variable $DVE_{curr}$ with a learnt pressure loss detection variable $DVE_{setp}$, pressure loss at the tire of the wheel or damage to the wheel suspension system is detected. If the deviation from current pressure loss detection variable $DVE_{curr}$ and learnt pressure loss detection variable $DVE_{setp}$ exceeds a detection threshold, a warning is output to the driver in block 4.

For example, a ratio between dimensional variables, for example the ratio e2/e3 between the two dimensional variables e2 and e3 is used as the pressure loss detection variable DVE:

$$DVE = \frac{e2}{e3} \quad (1)$$

The invention is therefore based on the fact that a change in the torsional and/or radial spring constant of the tire in the event of a pressure loss results in a change and/or redistribution of the energies in the oscillation spectrum of the wheel speed. For example the signal amplitudes of the associated natural frequency or resonant frequency (i.e. the level of the maximum/the amplitude in a frequency spectrum at the natural frequency or resonant frequency) change.

For example the spectral energies or signal amplitudes (i.e. the value of the natural frequency, in particular the energy content of the frequency spectrum of the wheel speed in the region of a natural frequency) are therefore evaluated in order to determine a tire air pressure or tire air pressure loss or to detect damage to the wheel suspension system.

A dimensional variable can be determined, for example, by integration of the spectrum over a limited frequency range.

However, since the spectral energies depend not only on the air pressure but also on further (interference) variables, the influences of these interference variables should be taken into account. Failure to consider these influences can lead to incorrect warnings or else to authorized warnings not occurring.

Significant interference variables which are taken into account are, for example:
 (a) road influences/coefficient of friction,
 (b) speed, and
 (c) load.

For example, monitoring of the tire air pressure is carried out with three dimensional variables e1, e2, e3 which describe the resonant amplitudes or values of three relevant oscillations in the wheel speed signal. The resonant amplitudes can also be considered to be signal energies.

The three abovementioned oscillations are, for example,
 (a) a wheel vertical oscillation,
 (b) a first wheel torsional oscillation, and
 (c) a second wheel torsional oscillation.

According to one exemplary embodiment, the respective frequency ranges from which the dimensional variables e1, e2, e3 are determined are predefined. For example, a resonant range of approximately 10 to 20 Hz is set for the wheel vertical oscillation, a resonant range of approximately 30 to 60 Hz is set for the first wheel torsional oscillation, and a resonant range of approximately 70 to 110 Hz is set for the second wheel torsional oscillation.

According to another exemplary embodiment, the relevant frequency ranges for the respective vehicle are determined individually. For this purpose, various methods can be used. For more precise determination as to which frequency intervals are used for calculating the dimensional variables, for example the actual resonant frequencies $f_{nat1}$, $f_{nat2}$, $f_{nat3}$ are first obtained for the corresponding vehicle and then used to define the frequency intervals. The relevant frequency ranges are selected, for example, as ranges of one or more different predefined frequency bands $\Delta f_{nati}$ about the specific resonant frequencies $f_{nati}$ ($f_{nati} \pm \Delta f_{nati}/2$ where i=1, 2 or 3).

Predefined frequency bands (for example $\Delta f_{nat1}$ about $f_{nat1}$) can, however, also firstly be assumed to be starting values for the frequency ranges. Starting from the starting values, the frequency ranges can then also be adapted to the present vehicle, i.e. to the specific frequency spectrums. In this way, vehicle-specific evaluation is possible.

The resonant frequencies $f_{nat1}$, $f_{nat2}$, $f_{nat3}$ of the three oscillations are, for example, obtained by means of parameter estimation of the corresponding transfer functions (for example equation (4) and (9) further below) in the respective frequency range. For this purpose, the wheel speed signal $\omega$ and its derivative/derivatives are used. The resonant frequency is determined from the estimated model parameters (see for example equation (5) and (6)).

Alternatively, the resonant frequencies $f_{nat1}$, $f_{nat2}$, $f_{nat3}$ can be found by means of a spectral analysis of the wheel speed signal ω as maximum values in the respective frequency ranges.

Figure 2:
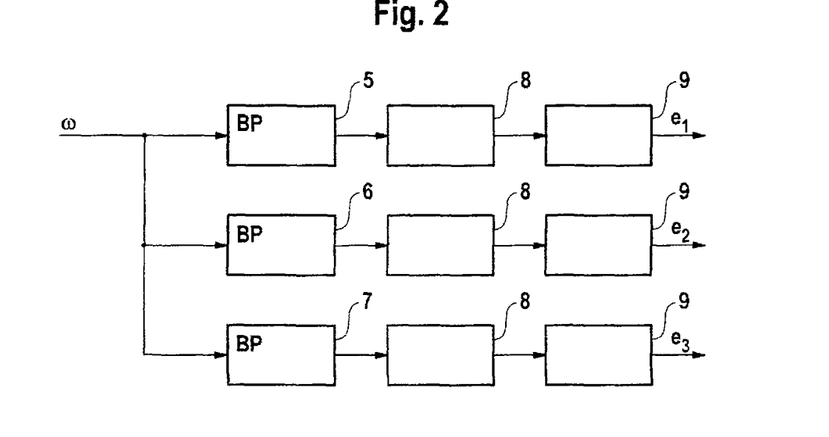
FIG. 2 shows a flowchart for determining dimensional variables according to a second exemplary embodiment of a method according to aspects of the invention.

FIG. 2 is a schematic illustration, in the form of a flowchart, of determination of the dimensional variables e1, e2, e3 according to a second exemplary embodiment of a method according to aspects of the invention. The wheel speed signal ω is filtered in the predefined or specific frequency ranges with a bandpass filter BP in each case. For example, the frequency range 10-20 Hz is filtered out in block 5, the frequency range 30-60 Hz is filtered out in block 6 and the frequency range 70-110 Hz is filtered out in block 7. In blocks 8, in each case the variance Var of the signal is determined and subsequently filtered in the blocks 9 with a mean value filter. This method for determining the dimensional variables e1, e2, e3 is advantageous since it is not necessary to obtain a frequency spectrum and the expenditure of an evaluation is thus relatively low.

The frequency band of each bandpass filter is to be selected here, for example, in such a way that in each case the amplitude maximum (resonant frequency $f_{nati}$) is included. This is important, in particular, in the event of unreliable determination of the relevant frequency range.

According to a third exemplary embodiment (not illustrated) of a method according to aspects of the invention, the dimensional variables e1, e2, e3 are obtained by means of a specific frequency spectrum of the wheel speed signal ω. The frequency spectrum is preferably calculated by means of a discrete Fourier transformation. This determination of the dimensional variables is advantageous in particular when the method according to aspects of the invention is combined with another indirect tire pressure loss method which is based on the evaluation/displacement of a resonant frequency which is obtained from a frequency spectrum. In this case, the frequency spectrum is already obtained within the scope of the other indirect method and only has to be then correspondingly evaluated.

For example, an unfiltered frequency spectrum is firstly determined from the speed signal ω of a wheel, for example by frequency analysis by means of a Fourier transformation. Such a spectrum is obtained, for example, with a 1 second clock cycle (therefore corresponds to a frequency resolution of 1 Hz). For example, averaging of the individual spectrums to form an overall spectrum is then carried out.

If the spectrum of the wheel speed signal ω is therefore available, the variables e1, e2, e3 can then be obtained directly from the spectrum. In this context, either the amplitude (for example $G(f_{nat1})$) can be determined directly at the obtained resonant frequency or a mean value about the resonant frequency is obtained (averaging of G(f) for frequency range $f_{lower} \leq f \leq f_{upper}$, in which case, for example, $f_{lower}$ can $=f_{nat1}-\Delta f_1/2$ and $f_{upper}$ can $=f_{nat1}+\Delta f_1/2$ with a predetermined interval width $\Delta f_1$). Alternatively, the energy content of the spectrum can also be used in a frequency range, i.e. the integral over the transfer function G in a frequency range (for example $f_{nat1}-\Delta f_1/2$ to $f_{nat1}+\Delta f_1/2$) about the respective natural frequency $$\int_{f_{nat1}-\Delta f_1/2}^{f_{nat1}+\Delta f_1/2} G(f) \cdot df.$$

As already mentioned above, different road excitations lead to different spectral densities in the individual frequency ranges of the frequency spectrum, as a result of which reliable pressure loss detection by means of the dimensional variables e1, e2, e3 can be disrupted. In order to compensate for this, in addition to or instead of the dimensional variables e1, e2, e3 themselves, their quotients (ratio between dimensional variables) are considered. A possible selection of ratios is e1/e2, e1/e3 and e2/e3 (alternatively, other ratios between the dimensional variables can also be formed). By means of the formation of quotients, displacements of the spectral density due to, for example, road excitations are compensated.

The pressure loss detection variable DVE is preferably formed from a ratio between two dimensional variables and at least one dimensional variable itself is additionally used to control the tire pressure monitoring method and/or to compensate the pressure loss detection variable DVE.

According to one exemplary embodiment, the tire pressure monitoring method is deactivated if a dimensional variable, for example e3, becomes greater than a first predefined threshold value or smaller than a second predefined threshold value.

Additionally or alternatively, a dimensional variable, for example e1, is used to compensate the pressure loss detection variable DVE (see also description below).

Increases or reductions in individual regions in the frequency spectrum are averaged out, for example, by filtering the dimensional variables (over time).

The vehicle velocity v influences, as a model parameter and as an excitation component, the dimensional variables e1, e2, e3. For this reason, according to one exemplary embodiment the dependencies of the dimensional variables and/or of the pressure loss detection variable DVE on the velocity are taken into account. For this purpose, a velocity dependence can be predefined as a functional relationship and taken into account directly in an explicit fashion (see equation (2)) or the velocity dependence is learnt and subsequently used for the compensation.

According to one exemplary embodiment, a pressure loss detection variable DVE is determined from the ratio e2/e3 between the two dimensional variables e2 and e3 and the vehicle velocity v in accordance with the following equation:

$$DVE = v^{3/2} \cdot \frac{e2}{e3} \quad (2)$$

This pressure loss detection variable DVE corresponds to a velocity-compensated ratio between dimensional variables. With the formation of quotient e2/e3, a large degree of independence from the route is achieved and the greater part of the velocity dependence of the pressure loss detection variable DVE is taken into account explicitly by means of the functional relationship $v^{3/2}$.

As an alternative to taking into account the vehicle velocity v described in equation (2) by means of a predefined relationship, the dependence on the vehicle velocity v can also be taken into account by learning the pressure loss detection variable DVE (for example $$DVE = \frac{e2}{e3}$$

according to equation (1)) in velocity intervals.

Furthermore, a more precise velocity dependence, for example on the basis of equation (2) (or see further below), can also be subsequently learnt.

According to another exemplary embodiment, instead of the quotient e2/e3 which was used in the exemplary embodiments described above the quotient e2/e1 is used to form a pressure loss detection variable DVE.

Nonlinearities, for example in the behavior of individual components of the wheel suspension systems (see also below), lead to excitation-dependent influencing of the dimensional variables. For this reason, the dependencies of the dimensional variables on one another and/or the dependencies of the ratios of dimensional variables on one another are advantageously learnt and subsequently used for compensation.

According to a further exemplary embodiment, the pressure loss detection variable DVE, for example according to equation (1) or (2), is learnt as a function of the energy ratio e1/e3. As a result, possible still remaining dependencies on the route are better taken into account. For this purpose, the pressure loss detection variable DVE is learnt in value intervals of e1/e3 and compared later.

The temperature T also influences the dimensional variables e1, e2, e3, for example via the tire damping (see the model parameters further below). For this reason, the dependencies of the dimensional variables or of the ratios of dimensional variables or of the pressure loss detection variable DVE on the temperature are advantageously learnt and subsequently used for the compensation. The temperature is obtained, for example, by means of sensors or a temperature model.

As an alternative to compensation, the temperature during the learning process can, in particular, be stored together with the learnt dimensional variables e1, e2, e3 or the pressure loss detection variable DVE and then compared with the (current) temperature during the pressure loss monitoring process/damage detection process. If these temperatures differ greatly, the run-in time of the filters can be increased or the system prevents a warning.

Figure 3:
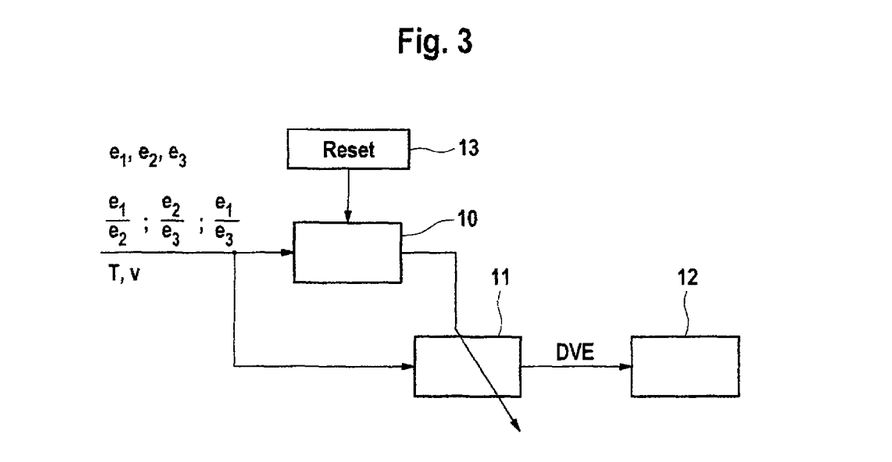
FIG. 3 shows a flowchart of a fourth exemplary embodiment of a method according to aspects of the invention.

FIG. 3 is a schematic illustration of a flowchart of a fourth exemplary embodiment of a method according to aspects of the invention. In addition to the dimensional variables e1, e2, e3 obtained and the ratios e1/e2, e2/e3, e1/e3 formed therefrom, the vehicle velocity v and the temperature T are also included as input variables in the pressure loss detection and/or damage detection. When the monitoring system is initialized or recalibrated, for example after a reset switch has been activated by the driver in block 13 (in this context the tire pressure/the tire pressures should correspond to the setpoint value or values thereof), the dependencies of the dimensional variables e1, e2, e3 and/or their ratios, for example the pressure loss detection variable DVE, between one another and/or on the vehicle velocity v and/or the temperature T are learnt in block 10. The relationships between the variables can be modeled by a linear or nonlinear parametric model of the input variables or by a black box system such as a neural network. Dependencies can also be learnt by mean values in specific intervals of input variables. After the learning phase, at least one setpoint value $DVE_{setp}$ of the pressure loss detection variable DVE is available for the monitoring of pressure loss. It is also possible for a plurality of setpoint values of the pressure loss detection variable DVE to be available if the pressure loss detection variable DVE is learnt, for example, in intervals of values of one variable (for example velocity v, temperature T and/or ratio e1/e3). The pressure loss detection variable DVE depends here essentially only now on the tire pressure. In order to monitor the pressure loss, the current input variables are used in block 11 together with the learnt dependencies to obtain a current, compensated value $DVE_{curr}$ of the pressure loss detection variable DVE. A pressure loss warning takes place in block 12 if the current pressure loss detection variable $DVE_{curr}$ exceeds the corresponding, learnt value $DVE_{setp}$ (for example with the same/similar value of the ratio e1/e3) by a threshold value S:

$$|DVE_{curr} - DVE_{setp}| > S \quad (3)$$

The threshold value S may be permanently predefined or may have been determined from vehicle information.

For example, the learning phase in block 10 is started by confirmation of a reset switch by the driver, but other starting conditions for a learning process are also conceivable.

In the text which follows, an example of a method for compensating a variable, for example the pressure loss detection variable DVE (for example according to equation (1) or (2)), in terms of another variable Y, for example the temperature T or the ratio e1/e3, is described. In this context, a functional relationship g (for example a linear relationship), specifically the parameters of the assumed functional relationship g, is learnt by means of specific (X, Y) value pairs, which relationship g describes the changing of the variable X from a setpoint value X0 and the interference influence Y and possible further variables:

$$X = g(X0, Y, \ldots)$$

For example, a linear relationship is set on the basis of the simple determinability by regression:

$$X = X0 + a*Y,$$

wherein the parameters X0 and a of the straight-line equation are determined, for example by fitting on the (X, Y) value pairs, in the learning phase 10. The parameter X0 then corresponds to the learnt comparison value (for example $DVE_{setp}$).

For the purpose of compensation (for example in the comparison phase 11), the currently obtained variable X is compensated by the inverse function $g^{-1}$. For this purpose, for example the currently obtained variable $X_{current}$ is compensated according to) $X_{comp} = X_{current} - a*Y_{current}$ by means of the current variable $Y_{current}$ and the learnt parameter a.

According to a further exemplary embodiment of the method according to aspects of the invention, what is referred to as a basic compensation of the pressure loss detection variable DVE is predefined, and is stored, for example, in a control unit in the form of a predefined functional relationship between pressure loss detection variable DVE and influencing variables (for example temperature T, velocity v, one or more dimensional variables e1, e2, e3) and corresponding predefined parameters of the functional relationship. This basic compensation is then optimized/improved in the learning phase.

For example, the basic compensation (predefined parameters) is read in after a reset. In the subsequent learning phase, optimized values for the parameters of the functional relationship are learnt by fitting the functional relationship to obtained value combinations (for example (DVE, T, v, e1) value combination). These optimized parameters are then used to compensate the pressure loss detection variable DVE in the comparison phase.

According to one example, a functional relationship $$DVE_{comp} = DVE_{current} + a*T + b*v + c*v^2 + d*e1$$

is set, wherein the influencing variables temperature T, velocity v and dimensional variable e1 are taken into account, and "starting values" are predefined for the parameters a, b, c and d. However, it is also conceivable to use a different functional relationship and/or to take into account a greater or lesser number of influencing variables. Improved values for the parameters a, b, c and d are then adapted in the learning phase.

Instead of the ratios ei/ej specified in the examples, it is also possible in each case to consider the reciprocal value ej/ei.

The method according to aspects of the invention permits wheel-specific detection of the tire pressure loss.

The described method for evaluating dimensional variables is also suitable for detecting damage to the wheel suspension system. When the components of the wheel suspension system change, the energy ratios also change, which can be detected by means of the dimensional variables e1, e2, e3 and/or their ratios.

In order to detect pressure loss it is also optionally possible to carry out an evaluation of the position of one or more resonances, i.e. the values of the resonant frequencies $f_{nat1}$, $f_{nat2}$, $f_{nat3}$. For this purpose, for example the positions of the resonant frequency of the wheel vertical frequency and wheel torsional frequency are evaluated together. An air pressure loss is detected or a pressure loss detection of another pressure loss detection method is supported if both resonant frequencies are lower than their respective learnt setpoint values.

According to a fifth exemplary embodiment, a method according to aspects of the invention based on a pressure loss detection variable DVE composed of two dimensional variables e1, e2, e3 (for example DVE according to equation (1) or (2)) is combined with a pressure loss detection method based on the displacement of at least one resonant frequency (for example a pressure loss detection variable DVE corresponds to a resonant frequency). In this context, the pressure loss detection is carried out, in terms of its focus, by means of the pressure loss detection variable DVE of one or other method as a function of the vehicle velocity v and/or a value of a dimensional variables (or of a ratio between two dimensional variables). Since the frequency shift, in particular at relatively low velocities v, and the method according to aspects of the invention at relatively high velocities v supply reliable results, for example corresponding weighting of the individual methods and the results thereof as a function of the velocities v is performed and combined to form an overall result.

In the text which follows, exemplary models are presented in order to describe and explain the torsional oscillation and the vertical dynamics of the tire, separately from one another. A separate consideration is possible since the two systems operate in different frequency ranges.

Figure 4:
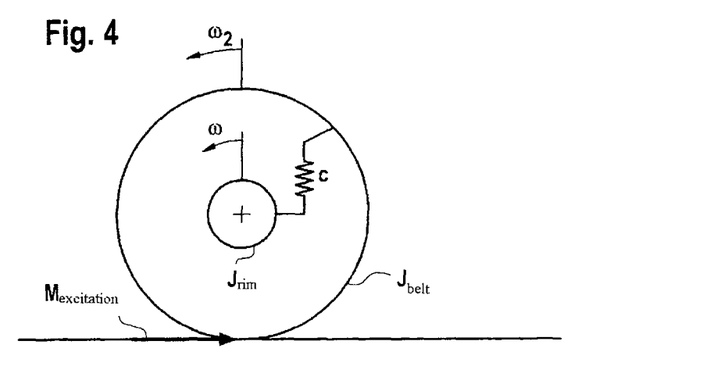
FIG. 4 shows a first model of a wheel.

In the text which follows, a model which describes the torsional oscillation is described first, said model giving rise to an exemplary movement equation. FIG. 4 is a schematic illustration of a model of the wheel. The wheel is described by the moment of inertia of the rim $J_{rim}$ and the moment of inertia of the tire belt $J_{belt}$. The torsional spring constant between the belt and the rim is denoted by c. The rotational speed of the belt, which corresponds to the rotational speed of the circumference of the wheel, is described by the angular speed $\omega_2$ and the rotational speed of the rim, which is measured, for example, with a wheel speed sensor, is described by the angular speed $\omega$. The radius of the tire is denoted by R.

The excitation moment $M_{excitation}$ which acts on the belt is described according to the model by means of the following slip equation:

$$M_{excitation} = a \cdot R \cdot \frac{v - \omega_2 \cdot R}{v}$$

Here, $\alpha$ represents the increase in the wheel torque as a function of the change in the wheel slip.

After the differential equations have been drawn up, the slip equation inserted and after transfer into the frequency range (Laplace transformation with the Laplace variable s), the following transfer function G is obtained between an excitation moment $M_{excitation}$ which acts on the belt and an angular speed $\omega$ which can be measured by a wheel speed sensor (equation (4)):

$$G = \frac{\omega}{M_{excitation}}$$

$$= \frac{1}{\frac{J_{rim} \cdot J_{belt}}{c} \cdot s^2 + \frac{J_{rim} \cdot R^2}{c} \frac{\alpha}{v} \cdot s^2 + (J_{rim} + J_{belt}) \cdot s + \frac{R^2 \alpha}{v}}$$

The moment of inertia of the rim $J_{rim}$ of the belt $J_{belt}$, the tire radius R and the spring constant c can be assumed to be constant for a vehicle without a change of tire and without a change in the tire pressure. The velocity v and the gradient of the torque/slip relationship $\alpha$ are variable during the journey.

The values of $s^3$, $s^2$ and s are obtained from the time derivatives of relatively high order of the angular speed $\omega$, and can therefore be determined from the measured angular speed $\omega$.

The absolute value of the transfer function |G| of the system changes as a function of the frequency f (the torsional oscillation) with the varying quotient $\alpha/v$. Depending on the quotient $\alpha/v$, either a resonant frequency $f_{nat2}$ occurs in the region of approximately 45 Hz, or else a resonant frequency $f_{nat3}$ occurs in the region of approximately 75 Hz.

In the boundary case $\alpha/v$ toward zero (i.e. high velocities v and/or smooth underlying surface), the following natural frequency of the system (high natural frequency $f_{nat3}$) occurs:

$$f_{nat3} = \frac{\sqrt{\frac{c(J_{rim} + J_{belt})}{J_{rim} \cdot J_{belt}}}}{2\pi} \quad (5)$$

For the other boundary case $\alpha/v$ toward the infinite, the natural frequency of the system is obtained as (relatively low natural frequency $f_{nat2}$):

$$f_{nat2} = \frac{\sqrt{\frac{c}{J_{rim}}}}{2\pi} \quad (6)$$

Figure 7:
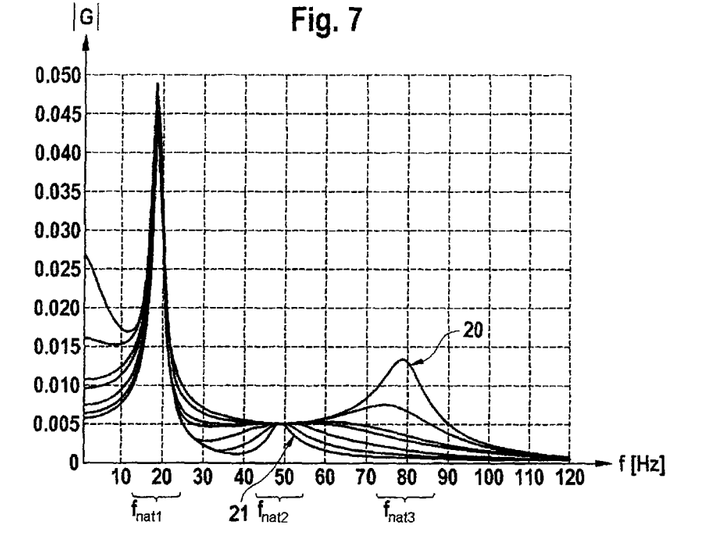
FIG. 7 shows an exemplary relationship between the transfer function and frequency for various values of $\alpha/v$.

For small $\alpha/v$, the high natural frequency $f_{nat3}$ (approximately 75-80 Hz) occurs, and as $\alpha/v$ increases further the system enters a transition region before the lower resonant frequency $f_{nat2}$ occurs as $\alpha/v$ rises even further (see also FIG. 7 and associated description).

For the consideration of the resonant amplitude for the relatively low natural frequency ($f_{nat2}$), equation (4) is simplified for the boundary case $\alpha/v$ toward the infinite. This boundary case describes the customary driving situation for a high coefficient of friction and moderate velocities v. The transfer function G obtained is:

$$\frac{\omega}{M_{excitation}} = \frac{c \cdot v}{J_{rim} \cdot R^2} \cdot \frac{1}{s^2 + \frac{(J_{rim} + J_{belt}) \cdot c \cdot v}{J_{rim} \cdot R^2 \cdot \alpha} \cdot s + \frac{c}{J_{rim}}} \quad (7)$$

The resonant amplitude $A^2_{max}$ is obtained with (equation (7) selected in accordance with k and d):

$$\frac{\omega}{M_{excitation}} = k \cdot \frac{1}{J_{rim} \cdot s^2 + d \cdot c \cdot s + c} \text{ as} \quad (8)$$

$$A^2_{max} = \frac{2 \cdot J_{rim}}{c^{3/2} \cdot d \cdot \sqrt{4m - d^2 \cdot c}} \quad (9)$$

When the tire pressure drops (pressure loss), the spring constant c is reduced and the resonant amplitude $A^2_{max}$ therefore becomes larger. This is illustrated schematically in the frequency range of $f_{nat2}$ (approximately 40-60 Hz) in FIG. 5.

Figure 6:
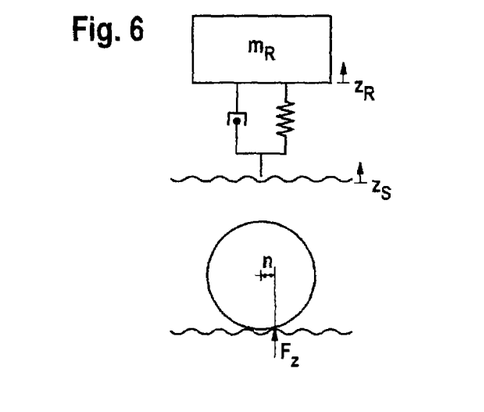
FIG. 6 shows a second model of a wheel.

In the text which follows, a model for describing and explaining the vertical dynamics of the tire, which gives rise to exemplary movement equations of the vertical oscillation, will be described with reference to FIG. 6. In the frequency spectrum of the wheel speed signal, a further resonant frequency $f_{nat1}$ (approximately 15-20 Hz) can be seen, which resonant frequency can be explained by the vertical dynamics of the tire. For the considered frequency range of the wheel dynamics it is sufficient to consider the wheel mass $m_R$ and the spring/shock absorber effect of the tire $c_R/d_R$. In the model used, the movement equation of the wheel (instantaneous deflection $z_R$) in the case of unevennesses of the road $z_s$ is as follows, with the force $F_z$ acting on the tire:

$$m_R \ddot{z}_R = c_R(z_s - z_R) + d_R(\dot{z}_s - \dot{z}_R) \quad (10)$$

$$F_z = c_R(z_s - z_R)$$

According to the physical law "force $F_z$ times lever arm n", the forces acting on the tire, which act on the tire via the rolling behavior and the geometry (for example of the wheel suspension system) of the section of road, give rise to a torque ($J_R$: moment of wheel inertia):

$$J_R \cdot \omega = F_z \cdot n$$

The following is obtained $$\omega = \frac{m_R \cdot c_R \cdot n \cdot J_R^{-1} \cdot s}{m_R s^2 + d_R s + c_R} \cdot z_s \quad (12)$$

and the resonant amplitude $A^1_{max}$:

$$A^1_{max} = \frac{m_R \cdot c_R \cdot n \cdot J_R^{-1}}{d_R} \quad (13)$$

When the air pressure drops, $c_R$ is reduced and the resonant amplitude $A^1_{max}$ therefore becomes smaller.

It is clearly possible to state that the oscillation of the tire in the vertical direction (caused, for example, by the excitation of the road) is superimposed on the wheel speed ω owing to the lever arm (wheel castern). The vertical oscillation can therefore be observed in the wheel speed signal ω, to be more precise in the frequency spectrum of the wheel speed.

Figure 5:
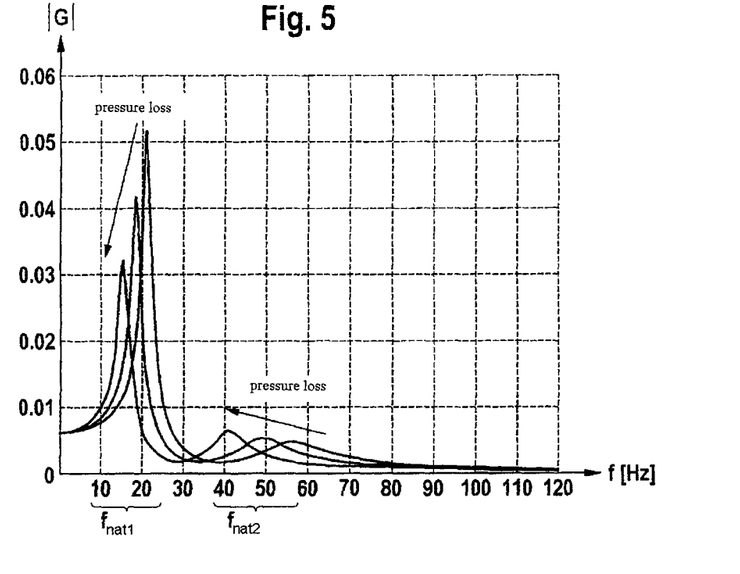
FIG. 5 shows an exemplary relationship between a transfer function and a frequency for various tire pressures.

In FIG. 5, exemplary frequency spectrums (absolute value of the transfer function G as a function of the frequency f) of a wheel speed signal are plotted for various tire pressures (a decrease in pressure is indicated by the arrows). FIG. 5 verifies once more the relationship described above according to which when there is a pressure loss the resonant amplitude of the (vertical) wheel oscillation at $f_{nat1}$ becomes smaller (and therefore the dimensional variable e1), while the resonant amplitude of the torsional oscillation at $f_{nat2}$ becomes larger (and therefore the dimensional variable e2).

An interference effect during an evaluation of the frequency spectrum is the dependence on the road excitation. The road excitation can be understood to be a further frequency spectrum which is superimposed on the system behavior. Two influences on the resonant amplitudes $A^1_{max}$, $A^2_{max}$, $A^3_{max}$ of the three natural frequencies follow from this:

(a) The total level of the resonant amplitudes varies with the type of road.

(b) Unevennesses in a road can lead to increases or reductions in individual regions in the frequency spectrum.

This leads to a dependence of the resonant amplitudes on the excitation.

A further interference effect is the dependence on nonlinearities. The individual components of the wheel suspension system, such as a tire, shock absorber, spring or rubber bearing, typically have a nonlinear behavior. This means that they have a system behavior which is dependent on the working point. In particular, individual components can therefore assume different parameters during operation as a result of different road excitations. This leads to a further dependence of the resonant amplitudes on the excitation.

A further interference effect is the dependence on the temperature. The properties individual components of the wheel suspension system are heavily dependent on the temperature. These include, in particular, the damping of the wheel and shock absorber, which are included directly in the equations of the resonant amplitudes.

Furthermore, the dependence on the coefficient of friction (of the road), the loading (of the vehicle) and the velocity (of the vehicle) are to be taken into account. Changes in the coefficient of friction, loading and velocity directly influence the quotient α/v from equation (4). This changes the values of the resonant frequencies, in particular in the case of $f_{nat2}$ and $f_{nat3}$, as already mentioned above.

Exemplary changes in the resonant amplitudes $A^1_{max}$, $A^2_{max}$, $A^3_{max}$ of the three considered natural frequencies $f_{nat1}$, $f_{nat2}$, $f_{nat3}$ in the event of a change in α/v are illustrated in FIG. 7. The uppermost curve 20 corresponds to a small value of α/v, and the bottom curve 21 corresponds to a large value of α/v. As can be seen, the resonant amplitude $A^1_{max}$ of the vertical oscillations at approximately 18 Hz ($f_{nat1}$) is influenced only to a small degree, and the resonant amplitude $A^2_{max}$ of the torsional oscillations at 50 Hz ($f_{nat2}$) is not influenced or is hardly influenced. However, the third resonance at approximately 80 Hz ($f_{nat3}$) occurs with a greater or smaller resonant amplitude $A^3_{max}$ as a function of α/v.

The torque/slip curve of a tire is dependent on the coefficient of friction p and the wheel load Fz. Exemplary curves 40, 41, 42 of the torque M are shown schematically as a function of the slip λ with a varying coefficient of friction p and wheel load Fz in FIG. 8. The variable a represents the increase in the torque M as a function of the change in the slip λ ($λ = (v - ω_2 R)/v$), i.e. the variable α can be considered to be the gradient of a torque/slip curve at a (working) point (the dashed line 43 indicates a gradient α for curve 41).

Figure 8:
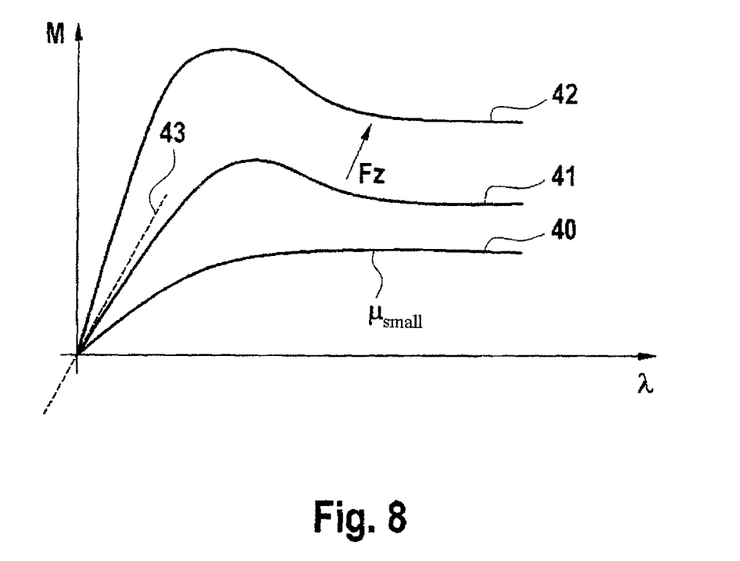
FIG. 8 shows exemplary dependencies between the torque and the slip.

All the variables which change α have an influence on the transmission function G and the resonant frequencies which occur.

A small coefficient of friction p generally gives rise to a relatively small α (curve 40 in FIG. 8).

α changes as a function of the current working point (drive torque/braking torque) on the torque/slip curve, α generally drops at relatively high slip values λ or torques M.

An increased wheel load $F_z$ (indicated by an arrow in FIG. 8), for example due to a load, gives rise to an increasing α.

The vehicle velocity v is included directly in a reciprocal fashion in α/v.

It is apparent that a tire pressure loss can be detected by monitoring dimensional variables which are based on the resonant amplitude (for example spectral energy density or energy content). Furthermore, the various influences should preferably be compensated.

The invention claimed is:

1. A method for indirectly monitoring tire pressure or for detecting damage to a wheel suspension system, said method comprising the steps of:
   determining a pressure loss detection variable (DVE) by an analysis of an oscillation behavior of a wheel of a motor vehicle,
   detecting a pressure loss at a tire of a wheel or damage to the wheel suspension system by comparing a currently determined pressure loss detection variable ($DVE_{cur}$) with a learnt pressure loss detection variable ($DVE_{setp}$), wherein at least two dimensional variables (e1, e2, e3), representing a torsional and a vertical dimension for the value of a frequency ($f_{nat1}$, $f_{nat2}$, $f_{nat3}$) or of a frequency range ($f_{lower}$, $f_{upper}$, $\Delta f_{nati}$) in an oscillation behavior of the wheel, are determined from a wheel speed signal (w) of the wheel, and
   wherein the pressure loss detection variable (DVE) is formed from the two dimensional variables (e1, e2, e3).

2. The method as claimed in claim 1, wherein the pressure loss detection variable (DVE) is calculated from a ratio between the two dimensional variables (e2/e3) and a vehicle velocity (v).

3. The method as claimed in claim 1, wherein at least two of the frequencies ($f_{nat1}$, $f_{nat2}$) or frequency ranges ($f_{nat1}\pm\Delta f_{nat1}/2$/$f_{nat2}\pm\Delta f_{nat2}/2$) are selected in such a way that corresponding dimensional variables (e1, e2) exhibit a different change in terms of their values or an opposing behavior in terms of their change in at least one of an event of a tire pressure loss and an event of a tire suspension damage.

4. The method as claimed in claim 1, wherein at least one dimensional variable (e1, e2, e3) is determined by filtering the wheel speed signal (ω) with a bandpass filter (BP).

5. The method as claimed in claim 4, wherein the at least one dimensional variable (e1, e2, e3) is obtained from a variance of a filtered signal.

6. The method as claimed in claim 5, wherein the at least one dimensional variable (e1, e2, e3) is obtained from the variance of a filtered signal after mean value filtering.

7. The method as claimed in claim 1, wherein
   (a) at least one dimensional variable (e1, e2, e3) is an amplitude value (G) of a frequency spectrum of the wheel speed signal (ω) at a predefined or specific frequency ($f_{nat1}$, $f_{nat2}$, $f_{nat3}$), or
   (b) at least one dimensional variable (e1, e2, e3) is determined by integrating or averaging amplitude values (G) of a frequency spectrum of the wheel speed signal ($\omega_1$) in a predefined or specific frequency range ($f_{nati}\pm, \Delta f_{nati}/2$).

8. The method as claimed in claim 1, wherein at least one of the frequencies and frequency ranges which are considered are at least one of resonant frequencies of the wheel oscillation and frequency ranges about resonant frequencies of the wheel oscillation, wherein at least one resonant frequency, is at least one of:
   predefined, or
   determined from an obtained frequency spectrum of the wheel speed signal (ω), or
   obtained from model parameters of at least one model or at least one model-based equation, wherein the model parameters are determined by parameter estimation with evaluation of the wheel speed signal (ω).

9. The method as claimed in claim 1, wherein at least one of the following dependencies are learnt and taken into account:
   (a) one dimensional variable (e1, e2, e3) and another dimensional variable (e1, e2, e3),
   (b) a ratio between dimensional variables (e2/e3) and another ratio between dimensional variables (e1/e3),
   (c) one dimensional variable (e1, e2, e3) and a vehicle velocity (v),
   (d) a ratio between dimensional variables (e2/e3) and a vehicle velocity (v),
   (e) a dimensional variable (e1, e2, e3) and a temperature (T), and
   (f) a ratio between dimensional variables (e2/e3) and a temperature (T).

10. The method as claimed in claim 9, wherein the at least one dependence is predefined or determined in a form of a functional relationship (g) between one variable (X) and another variable (Y), or in that the dependence is taken into account by learning and comparing one variable in value intervals of the other variable.

11. The method as claimed in claim 9, wherein the at least one dependence is/are used to determine at least one compensated dimensional variable (e1, e2, e3) or one compensated pressure loss detection variable (DVE).

12. The method as claimed in claim 9, wherein the ratio between dimensional variables (e2/e3) includes the pressure loss detection variable (DVE).

13. The method as claimed in claim 1, wherein said method is combined with a method whose pressure loss detection variable (DVE) is a resonant frequency (f) for indirectly monitoring tire pressure.

14. The method as claimed in claim 1, wherein the pressure loss detection is carried out as a function of the vehicle velocity (v) and/or the values of the dimensional variables (e1, e2, e3).

15. The method as claimed in claim 14, wherein the pressure loss detection is carried out as a function of a value of a ratio between the dimensional variables, by means of the one or other method for indirectly monitoring tire pressure.

16. A tire pressure monitoring system in which a wheel speed (ω) of at least one wheel or a variable which is associated with the wheel speed (ω) of the wheel is obtained and is evaluated for detection of a tire pressure loss, wherein said tire pressure monitoring system comprises an evaluation means in which a method according to claim 1 is carried out.

17. A method for indirectly monitoring tire pressure or for detecting damage to a wheel suspension system, said method comprising the steps of:
   determining a pressure loss detection variable (DVE) by an analysis of an oscillation behavior of a wheel of a motor vehicle,
   detecting a pressure loss at a tire of a wheel or damage to the wheel suspension system by comparing a currently determined pressure loss detection variable ($DVE_{cur}$) with a learnt pressure loss detection variable ($DVE_{setp}$), wherein at least two dimensional variables (e1, e2, e3), which each represent a dimension for the value of a frequency ($f_{nat1}$, $f_{nat2}$, $f_{nat3}$) or of a frequency range ($f_{lower}$, $f_{upper}$, $\Delta f_{nati}$) in an oscillation behavior of the wheel, are determined from a wheel speed signal (w) of the wheel, and wherein the pressure loss detection variable (DVE) is formed from the two dimensional variables (e1, e2, e3)

wherein dimensional variables (e1, e2, e3) are determined for at least one of at least three different frequencies and at least three different frequency ranges, and wherein the three dimensional variables (e1, e2, e3) are used for at least one of pressure loss detection and damage detection.

18. The method as claimed in claim 17, wherein the pressure loss detection variable (DVE) is formed from two of the dimensional variables (e1, e2, e3) and wherein the pressure loss detection variable (DVE) is considered as a function of the third dimensional variable (e1).

19. The method as claimed in claim 18, wherein the pressure loss detection variable (DVE) is considered as a function of a ratio between two dimensional variables (e1/e3) which contains the third dimensional variable (e1).

20. A method for indirectly monitoring tire pressure or for detecting damage to a wheel suspension system, said method comprising the steps of:
 determining a pressure loss detection variable (DVE) by an analysis of an oscillation behavior of a wheel of a motor vehicle,
 detecting a pressure loss at a tire of a wheel or damage to the wheel suspension system by comparing a currently determined pressure loss detection variable ($DVE_{cur}$) with a learnt pressure loss detection variable ($DVE_{setp}$), wherein at least two dimensional variables (e1, e2, e3), which each represent a dimension for the value of a frequency ($f_{nat1}$, $f_{nat2}$, $f_{nat3}$) or of a frequency range ($f_{lower}$, $f_{upper}$, $\Delta f_{nati}$) in an oscillation behavior of the wheel, are determined from a wheel speed signal (w) of the wheel
 wherein the pressure loss detection variable (DVE) is formed from the two dimensional variables (e1, e2, e3), and
 wherein the pressure loss detection variable (DVE) is formed from a ratio between the two dimensional variables (e2/e3).

* * * * *

UNITED STATES PATENT AND TRADEMARK OFFICE
CERTIFICATE OF CORRECTION

PATENT NO.       : 8,634,983 B2                                         Page 1 of 1
APPLICATION NO.  : 12/747063
DATED            : January 21, 2014
INVENTOR(S)      : Irth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 439 days.

Signed and Sealed this
Twenty-second Day of September, 2015

Michelle K. Lee
*Director of the United States Patent and Trademark Office*